Figure 1:
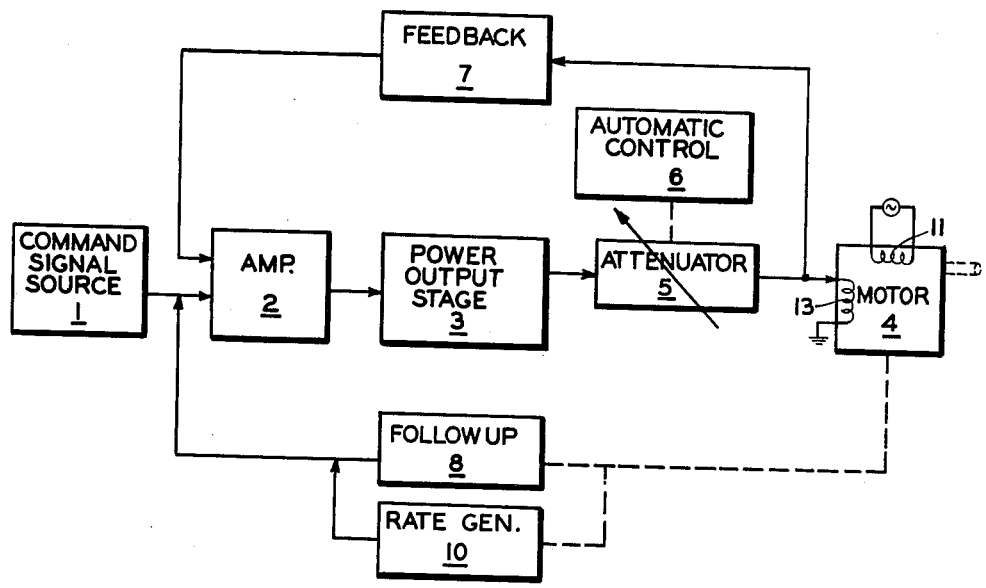

May 8, 1962 C. W. McWILLIAMS 3,034,032
SERVOSYSTEM
Filed Jan. 28, 1958

INVENTOR.
CHARLES W. McWILLIAMS
BY
*Chas. M. Frankhouser*
ATTORNEY

United States Patent Office 3,034,032
Patented May 8, 1962

3,034,032
SERVOSYSTEM
Charles W. McWilliams, Allendale, N.J., assignor to The
Bendix Corporation, a corporation of Delaware
Filed Jan. 28, 1958, Ser. No. 711,735
6 Claims. (Cl. 318—434)

The invention relates to servosystems and more particularly to force limiting means for such systems.

The torque exerted by servosystems on the control surfaces of aircraft must be limited because of structural limitations of the aircraft, and the maximum permissible torque varies for the several control surfaces. Also, the maximum permissible torque may vary during flight as a function of one or more parameters. Servosystems for actuating the control surfaces of high speed aircraft in use today require relatively high torque to accurately control and stabilize the craft and in some instances the required torque approaches the maximum permissible torque. Since it is desirable to utilize the same type servosystems to actuate the various control surfaces, the maximum torque of the servosystem must conform with the maximum permissible load which may be imposed on the particular control surface and the maximum torque must be varied as a function of flight parameters without reducing the torque gradient of the servomotor.

Various means have been proposed for limiting the torque of servosystems but each have certain shortcomings. The torque of a two phase servomotor may be limited by limiting the voltage exciting either the fixed or variable phase, but this decreases the torque gradient of the motor. Mechanical and electromechanical slip clutches have been used but the maximum torque varies with time and temperature. Furthermore, the mechanical methods of limiting servo torque do not permit variation of maximum torque as a function of flight parameters.

One object of the invention is to provide a servosystem which maintains a substantially constant torque gradient over a wide operating range and in which the torque can be limited.

Another object of the invention is to provide a servosystem which maintains a constant torque gradient irrespective of the maximum torque to which the system is limited.

Another object is to provide a servosystem which maintains a high torque gradient over a wide operating range and in which the maximum torque may be varied.

A further object of the invention is to provide a servosystem for aircraft having a high torque gradient over a wide operating range and in which the maximum torque may be varied as a function of one or more flight parameters or according to a predetermined schedule.

The invention contemplates a servosystem comprising an amplifier having an input adapted to be connected to a signal source and having an output, an attenuator connected to the amplifier output to determine the maximum output of the system, and feedback means connecting the attenuator to the amplifier input and degeneratively feeding back to the input a voltage corresponding to the output of the system to maintain the gain of the amplifier substantially constant to the maximum. An actuator may be connected to the attenuator and the maximum output of the actuator is determined by the adjustment of the attenuator.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
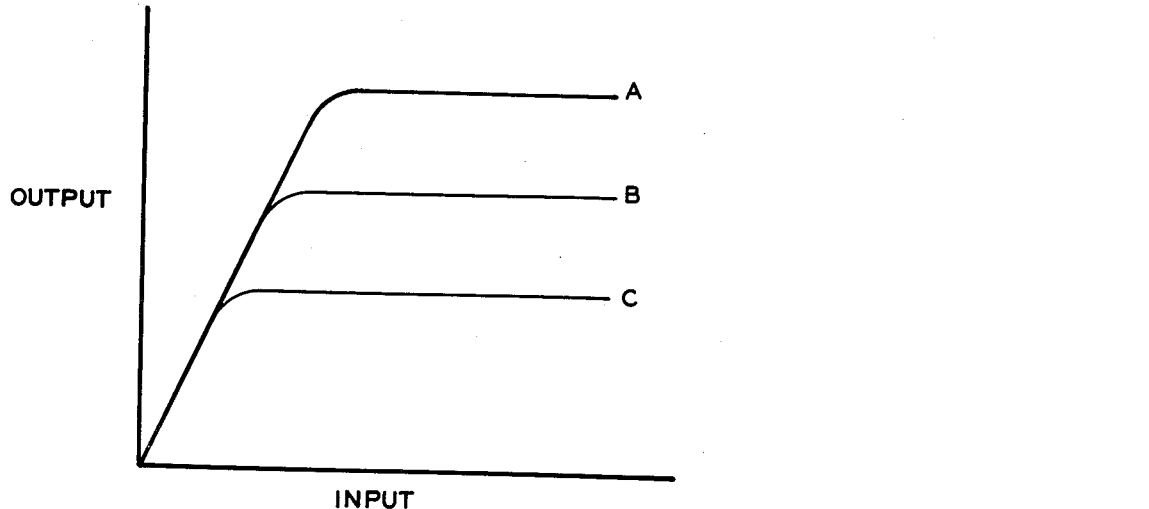

In the drawings:

FIGURE 1 is a block diagram of a novel servosystem constructed according to the invention; and FIGURE 2 is a graph showing the servosystem output plotted against the system input for different operating conditions.

Referring to FIGURE 1 of the drawings, a servosystem having novel torque limiting means constructed according to the invention is shown therein and comprises an amplifier 2 having its input connected to a command signal source 1. The output of the amplifier is connected to the input of a power output stage 3, which has its output connected through an attenuator 5 to a servomotor 4 for operating a craft control surface or other device. The servomotor may be of the two phase type having its fixed phase 11 connected to an alternating current source and its variable phase 13 connected to attenuator 5.

A degenerative feedback circuit 7, which may include a transformer to determine the proportion of feedback voltage, connects the motor input to the input of amplifier 2. A follow-up signal device 8 and a rate generator 10 are drivably connected to motor 4 and are connected electrically to the input of amplifier 2 and provide signals corresponding to the displacement of motor 4 and to its rate of rotation.

Attenuator 5 may comprise a variable resistor which may be adjusted to any suitable value, either manually or automatically by a device 6 as a function of one or more flight parameters, such as airspeed, or according to a predetermined schedule.

Command signals from source 1 together with follow-up signals from follow-up device 8 and rate sigals from rate generator 10 are applied to amplifier 2. The amplified signals at the output of amplifier 2 are applied to power output stage 3. The output of power output stage 3 is impressed through attenuator 5 on the variable phase 13 of motor 4. A voltage proportional to the voltage impressed on motor 4 is also applied through feedback transformer 7 to the input of amplifier 2 in a regenerative fashion to provide a constant torque gradient by stabilizing the overall gain of amplifier 2, power output stage 3 and attenuator 5. The maximum torque delivered by motor 4 may be limited to any desired value without decreasing the torque gradient by suitable adjustment of attenuator 5, and in FIGURE 2 three curves A, B and C show the torque output of motor 4 corresponding to command signals from source 1 for three adjustments of attenuator 5.

Power output stage 3 limits energization of motor 4 and curve A shows the torque output of motor 4 when the attenuator resistance is zero and represents the maximum torque output of the system. Increasing the resistance of attenuator 5 decreases maximum energization of motor 4 and, hence, maximum torque, as shown in curves B and C of FIGURE 2.

The servosystem described maintains a substantially constant high torque gradient over a wide operating range, irrespective of the maximum torque to which the system is limited, and the maximum torque may be varied as a function of one or more flight parameters or according to a predetermined schedule.

Although but one embodiment of the invention has been illustrated and described, various changes can be made in the design and arrangement of the parts without departing from the spirit and scope of the invention as the same will now be understood by those skilled in the art. While the servosystem has been described in connection with limiting the torque of an electric motor, it should be understood that any actuator can be used, either rotating or reciprocating, and the maximum torque or force of the actuator may be limited in the manner described herein.

What is claimed is:

1. In a servosystem, amplifier means having an input adapted to be connected to a signal source and having an output, an attenuator connected to the amplifier means output to determine the maximum output of the system, and feedback means connecting the attenuator to the amplifier input and degeneratively feeding back to the input a voltage corresponding to the output of the system to maintain the gain of the amplifier substantially constant to the maximum.

2. The device defined in claim 1 wherein the attenuator is varied as a function of a variable parameter.

3. A servosystem for actuating a control surface of an aircraft in response to error signals supplied thereto comprising an amplifier having an input for amplifying the error signal, a motor for actuating the control surface in response to the error signal, voltage attenuating means connecting the amplifier and the motor to limit the maximum voltage applied to the motor, and degenerative feedback means connecting the attenuator to the amplifier input for supplying overall negative feedback corresponding to the voltage applied to the motor to maintain a substantially constant servosystem output gradient up to the maximum.

4. The device defined in claim 3 wherein the voltage attenuating means is varied as a function of a flight parameter.

5. A servosystem comprising an amplifier having an input for receiving an error signal, a motor having an input, voltage attenuating means connecting the amplifier and the motor input to limit the maximum voltage applied to the motor, and degenerative feedback means connecting the motor input to the amplifier input to maintain a substantially constant servosystem output gradient up to the maximum.

6. A device as described in claim 5 in which the voltage attenuating means is varied as a function of a variable parameter.

References Cited in the file of this patent
UNITED STATES PATENTS

| | | |
|---|---|---|
| 2,595,034 | Wild | Apr. 29, 1952 |
| 2,673,314 | MacCallum | Mar. 23, 1954 |
| 2,743,407 | Geyger | Apr. 24, 1956 |
| 2,754,463 | Hansen et al. | July 10, 1956 |
| 2,866,933 | Bond | Dec. 30, 1958 |